US008397237B2

(12) United States Patent
Rumelhart et al.

(10) Patent No.: US 8,397,237 B2
(45) Date of Patent: *Mar. 12, 2013

(54) DYNAMICALLY ALLOCATING THREADS FROM A THREAD POOL TO THREAD BOUNDARIES CONFIGURED TO PERFORM A SERVICE FOR AN EVENT

(75) Inventors: Karl E. Rumelhart, Palo Alto, CA (US); Timothy Tuttle, San Francisco, CA (US); Jeremy S. Lueck, Cambridge, MA (US); J. Joseph Benevidez, Denver, CO (US); Charles E. Cano, New York City, NY (US); Alex Huang, Creve Coeur, MO (US)

(73) Assignee: Shaw Parsing, L.L.C., Los Altos, CA (US)

( * ) Notice: Subject to any disclaimer, the term of this patent is extended or adjusted under 35 U.S.C. 154(b) by 1215 days.

This patent is subject to a terminal disclaimer.

(21) Appl. No.: 11/205,263

(22) Filed: Aug. 15, 2005

(65) Prior Publication Data

US 2006/0117318 A1   Jun. 1, 2006

Related U.S. Application Data

(60) Provisional application No. 60/602,539, filed on Aug. 17, 2004.

(51) Int. Cl.
*G06F 9/46* (2006.01)
(52) U.S. Cl. .......................... 718/104; 718/102; 718/105
(58) Field of Classification Search .................. 718/104, 718/107; 719/316, 318; 709/314
See application file for complete search history.

(56) References Cited

U.S. PATENT DOCUMENTS

| 5,031,089 | A |   | 7/1991  | Liu et al.        |         |
|-----------|---|---|---------|-------------------|---------|
| 5,230,048 | A |   | 7/1993  | Moy               |         |
| 5,535,335 | A |   | 7/1996  | Cox et al.        |         |
| 5,692,193 | A | * | 11/1997 | Jagannathan et al.| 718/106 |
| 5,699,523 | A | * | 12/1997 | Li et al.         | 709/238 |
| 5,706,516 | A |   | 1/1998  | Chang et al.      |         |
| 5,822,543 | A |   | 10/1998 | Dunn et al.       |         |
| 5,878,420 | A |   | 3/1999  | de la Salle       |         |
| 5,886,643 | A |   | 3/1999  | Diebboll et al.   |         |

(Continued)

FOREIGN PATENT DOCUMENTS

| CN | 101040261 A | 9/2007 |
|----|-------------|--------|
| EP | 0 733 983 A2 | 9/1996 |

(Continued)

OTHER PUBLICATIONS

Matthew David Welsh: "An Architecture for Highly Concurrent, Well-Condidtioned Internet Services":Online! 2002, pp. 1-211, XP002357233 University of California at Berkeley Retrieved from the Internet: URL:http://www.eecs.harvard.edu/~mdw/papers-phdthesis.pdf> figures 8,9, p. 48-p. 54, p. 101, p. 113-p. 114.*

(Continued)

*Primary Examiner* — Meng An
*Assistant Examiner* — Tammy Lee
(74) *Attorney, Agent, or Firm* — Sterne, Kessler, Goldstein & Fox P.L.L.C.

(57) ABSTRACT

Each of a plurality of thread boundaries comprises functionality to be performed for a given event by a single thread. A plurality of queues through which events may be routed may be coupled to the thread boundaries. A plurality of tasks may be configured in a defined relationship, each task being associated with a thread boundary and comprising a unit of code for performing a specific function. Resources may be allocated to thread boundaries based on queue depth.

31 Claims, 4 Drawing Sheets

U.S. PATENT DOCUMENTS

| | | | |
|---|---|---|---|
| 5,933,429 A * | 8/1999 | Bubenik et al. | 370/392 |
| 5,938,733 A * | 8/1999 | Heimsoth et al. | 709/230 |
| 5,964,839 A | 10/1999 | Johnson et al. | |
| 5,974,457 A | 10/1999 | Waclawsky et al. | |
| 6,018,619 A | 1/2000 | Allard et al. | |
| 6,029,175 A | 2/2000 | Chow et al. | |
| 6,052,447 A | 4/2000 | Golden et al. | |
| 6,055,493 A | 4/2000 | Ries et al. | |
| 6,094,681 A | 7/2000 | Shaffer et al. | |
| 6,112,240 A | 8/2000 | Pogue et al. | |
| 6,173,406 B1 | 1/2001 | Wang et al. | |
| 6,233,600 B1 | 5/2001 | Salas et al. | |
| 6,240,451 B1 | 5/2001 | Campbell et al. | |
| 6,253,167 B1 | 6/2001 | Matsuda et al. | |
| 6,308,209 B1 | 10/2001 | Lecheler | |
| 6,324,587 B1 | 11/2001 | Trenbeath et al. | |
| 6,363,421 B2 | 3/2002 | Barker et al. | |
| 6,366,926 B1 | 4/2002 | Pohlmann et al. | |
| 6,377,939 B1 * | 4/2002 | Young | 705/34 |
| 6,405,245 B1 | 6/2002 | Burson et al. | |
| 6,408,282 B1 | 6/2002 | Buist | |
| 6,418,448 B1 | 7/2002 | Sarkar | |
| 6,418,467 B1 | 7/2002 | Schweitzer et al. | |
| 6,446,257 B1 | 9/2002 | Pradhan et al. | |
| 6,484,143 B1 | 11/2002 | Swildens et al. | |
| 6,502,131 B1 | 12/2002 | Vaid et al. | |
| 6,539,427 B1 | 3/2003 | Natarajan et al. | |
| 6,553,413 B1 | 4/2003 | Leighton et al. | |
| 6,560,611 B1 | 5/2003 | Nine et al. | |
| 6,567,411 B2 | 5/2003 | Dahlen | |
| 6,577,328 B2 | 6/2003 | Matsuda et al. | |
| 6,606,643 B1 | 8/2003 | Emens et al. | |
| 6,609,138 B1 | 8/2003 | Merriam | |
| 6,654,804 B1 | 11/2003 | Fleming | |
| 6,658,652 B1 | 12/2003 | Alexander et al. | |
| 6,687,729 B1 * | 2/2004 | Sievert et al. | 718/102 |
| 6,691,165 B1 | 2/2004 | Bruck et al. | |
| 6,725,446 B1 | 4/2004 | Hahn et al. | |
| 6,728,747 B1 | 4/2004 | Jenkins et al. | |
| 6,751,663 B1 | 6/2004 | Farrell et al. | |
| 6,769,009 B1 | 7/2004 | Reisman | |
| 6,789,115 B1 | 9/2004 | Singer et al. | |
| 6,792,458 B1 | 9/2004 | Muret et al. | |
| 6,829,642 B1 | 12/2004 | Giroir et al. | |
| 6,836,886 B2 | 12/2004 | Tuerke et al. | |
| 6,871,346 B1 | 3/2005 | Kumbalimutt et al. | |
| 6,970,924 B1 | 11/2005 | Chu et al. | |
| 6,978,461 B2 | 12/2005 | Shapiro et al. | |
| 6,986,140 B2 | 1/2006 | Brenner et al. | |
| 7,020,082 B2 | 3/2006 | Bhagavath et al. | |
| 7,043,525 B2 | 5/2006 | Tuttle et al. | |
| 7,051,070 B2 | 5/2006 | Tuttle et al. | |
| 7,107,326 B1 | 9/2006 | Fijolek et al. | |
| 7,114,158 B1 * | 9/2006 | Thompson et al. | 718/106 |
| 7,127,720 B2 | 10/2006 | Cano et al. | |
| 7,159,034 B1 | 1/2007 | Rai | |
| 7,207,043 B2 | 4/2007 | Blythe et al. | |
| 7,249,197 B1 | 7/2007 | Roestenburg et al. | |
| 7,277,917 B2 | 10/2007 | Tuttle et al. | |
| 7,290,259 B2 | 10/2007 | Tanaka et al. | |
| 7,293,074 B1 | 11/2007 | Jellinek et al. | |
| 7,350,213 B2 * | 3/2008 | Deutesfeld et al. | 719/316 |
| 7,412,518 B1 | 8/2008 | Duigou et al. | |
| 7,430,610 B2 | 9/2008 | Pace et al. | |
| 7,467,390 B2 * | 12/2008 | Gilgen et al. | 719/318 |
| 7,552,446 B1 | 6/2009 | Sosnovsky et al. | |
| 7,581,230 B2 | 8/2009 | Chen et al. | |
| 2001/0005853 A1 | 6/2001 | Parkes et al. | |
| 2001/0012299 A1 | 8/2001 | Dahlen | |
| 2002/0078251 A1 * | 6/2002 | Lewis | 709/314 |
| 2002/0087611 A1 * | 7/2002 | Tanaka et al. | 709/1 |
| 2002/0087630 A1 | 7/2002 | Wu | |
| 2002/0095399 A1 | 7/2002 | Devine et al. | |
| 2002/0120717 A1 | 8/2002 | Giotta | |
| 2003/0005025 A1 | 1/2003 | Shavit et al. | |
| 2003/0026254 A1 | 2/2003 | Sim | |
| 2003/0041110 A1 | 2/2003 | Wenocur et al. | |
| 2003/0050956 A1 * | 3/2003 | Janssen et al. | 709/201 |
| 2003/0110204 A1 * | 6/2003 | Brenner et al. | 709/103 |
| 2003/0120817 A1 | 6/2003 | Ott et al. | |
| 2003/0140111 A1 | 7/2003 | Pace et al. | |
| 2004/0139433 A1 * | 7/2004 | Blythe et al. | 718/100 |
| 2004/0148606 A1 * | 7/2004 | Hosoe | 718/100 |
| 2004/0199926 A1 * | 10/2004 | Gilgen et al. | 719/318 |
| 2004/0215493 A1 | 10/2004 | Koppes et al. | |
| 2004/0252709 A1 | 12/2004 | Fineberg | |
| 2005/0033841 A1 | 2/2005 | McCarthy et al. | |
| 2005/0125557 A1 | 6/2005 | Vasudevan et al. | |
| 2005/0278726 A1 | 12/2005 | Cano et al. | |
| 2006/0031282 A1 | 2/2006 | Tuttle et al. | |
| 2006/0031283 A1 | 2/2006 | Tuttle et al. | |
| 2006/0041681 A1 | 2/2006 | Rumelhart | |
| 2006/0075279 A1 | 4/2006 | Cameros et al. | |
| 2006/0117318 A1 | 6/2006 | Rumelhart et al. | |
| 2006/0136930 A1 * | 6/2006 | Kaler et al. | 718/105 |
| 2006/0265488 A1 | 11/2006 | Tuttle et al. | |
| 2007/0033293 A1 | 2/2007 | Rumelhart | |
| 2007/0050519 A1 | 3/2007 | Cano et al. | |
| 2007/0061811 A1 | 3/2007 | Rumelhart et al. | |
| 2007/0239822 A1 | 10/2007 | Tuttle et al. | |
| 2009/0077173 A1 | 3/2009 | Lowery et al. | |

FOREIGN PATENT DOCUMENTS

| | | |
|---|---|---|
| EP | 0 749 081 A1 | 12/1996 |
| EP | 0 889 421 A1 | 1/1999 |
| EP | 1789875 A1 | 5/2007 |
| JP | 2008510259 T | 4/2008 |
| KR | 1020070057838 A | 6/2007 |
| WO | WO 97/16796 A1 | 5/1997 |
| WO | WO 01/63837 A2 | 8/2001 |
| WO | 2005/046184 A1 | 5/2005 |
| WO | WO 2005/046184 A1 | 5/2005 |
| WO | WO 2006/023506 A1 | 3/2006 |

OTHER PUBLICATIONS

David Cormona: "Programming the Thread Pool in the .NET Framework" MSDN, :Online! Jun. 2002, pp. 1-17, XP002357234 URL:http://msdn.microsoft.com/en-us/library/ms973903.aspx> p. I-p. 17.*

Welsh, Matthew D.; "An Architecture for Highly Concurrent, Well-Conditioned Internet Services"; URL:http://www.eecs.harvard.edu/{mdw/papers/mdw-phdthesis/pdf>, 2005, pp. 48-54, 101, and 113-114.

Carmona, David.; "Programming the Thread Pool in the .NET Framework"; 'Online' Jun. 2002, pp. 1-17, XP002357234; retrieved on Dec. 1, 2005 from the Internet: URL:http://msdn.microsoft.com/library/default.asp?url=/library/en-us/dndotnet/hmtl/progthrepool.asp>, pp. 1-17.

Non-Final Office Action dated May 3, 2005, U.S. Appl. No. 10/017,182, Tuttle et al., filed Dec. 14, 2001.

Notice of Allowance dated Jan. 3, 2006, U.S. Appl. No. 10/105,018, Tuttle et al., filed Mar. 21, 2002.

Notice of Allowance dated Jul. 5, 2006, U.S. Appl. No. 10/105,018, Tuttle et al., filed Mar. 21, 2002.

Non-Final Office Action dated Aug. 9, 2005, U.S. Appl. No. 10/213,269, Cano et al., filed Aug. 5, 2002.

Final Office Action dated Jan. 26, 2006, U.S. Appl. No. 10/213,269, Cano et al., filed Aug. 5, 2002.

Notice of Allowance dated Jun. 6, 2006, U.S. Appl. No. 10/213,269, Cano et al., filed Aug. 5, 2002.

Non-Final Office Action dated Feb. 3, 2009, U.S. Appl. No. 11/205,233, Rumelhart et al., filed Aug. 15, 2005.

Non-Final Office Action dated Aug. 6, 2009, U.S. Appl. No. 11/205,233, Rumelhart et al., filed Aug. 15, 2005.

Non-Final Office Action dated Apr. 22, 2008, U.S. Appl. No. 11/205,237, Cameros et al., filed Aug. 15, 2005.

Non-Final Office Action dated Apr. 29, 2009, U.S. Appl. No. 11/205,237, Cameros et al., filed Aug. 15, 2005.

Final Office Action dated Nov. 25, 2008, U.S. Appl. No. 11/205,237, Cameros et al., filed Aug. 15, 2005.

Notice of Allowance dated May 22, 2007, U.S. Appl. No. 11/347,802, Tuttle et al., filed Feb. 3, 2006.

Non-Final Office Action dated Jan. 26, 2007, U.S. Appl. No. 11/347,802, Tuttle et al., filed Feb. 3, 2006.
Non-Final Office Action dated Jul. 23, 2009, U.S. Appl. No. 11/396,251, Tuttle et al., filed Mar. 3, 2006.
Non-Final Office Action dated Mar. 6, 2009, U.S. Appl. No. 11/515,233, Rumelhart et al., filed Aug. 31, 2006.
Franklin et al., "Dissemination-Based Information Systems," IEEE Data Engineering Bulletin, vol. 19, No. 3, Sep. 1996, 9 pages.
Nagami et al., "Toshiba's Flow Attribute Notification Protocol (FANP) Specification," Apr. 1997, RFC 2129, Internet RFC/STD/FYI/BCP Archives [online], [retrieved on May 16, 2002]. Retrived from the Internet: <landfield.com/rfcs/rfc2129.html>, 16 pages.
Strom et al., "Gryphon: An Information Flow Based Approach to Message Brokering," International Symposium on Software Reliability Engineering '98, 1998, 2 pages.
Sturman et al., "Reflection in the Gryphon Message Brokering System," Reflection Workshop of the 13.sup.th ACM Conference on Object Oriented Program Systems, Languages and Applications (OOPSLA '98), 1998, 5 pages.
International DOI Foundation, "Introduction to the Digital Object Identifier," [online]. Apr. 1998 [retrieved on May 16, 2002]. Retrieved from the Internet: <doi.org/introduction.html.>, 4 pages.
Aksoy et al., "Research in Data Broadcast and Dissemination", Proc. 1st Int'l Conf. on Advanced Multimedia Content Processing, Osaka University, Osaka, Japan, Nov. 1998.
Banavar et al., "An Efficient Multicast Protocol for Content-Based Publish-Subscribe Systems," Proc. of the 19th International Conference on Distributed Computing Systems, 1999, 9 pages.
Banavar et al., "Information Flow Based Event Distribution Middleware," Proceedings of the 1999 ICDCS Workshop on Electronic Commerce and Web-Based Applications, 1999, 8 pages.
Aguilera et al., "Matching Events in a Content-based Subscription System," Eighteenth ACM Symposium on Principles of Distributed Computing (PODC '99), Atlanta, GA, May 4-6, 1999, 9 pages.
Banavar et al., "A Case for Message Oriented Middleware," Distributed Computing, 13.sup.th International Symposium, Bratislava, Slavak Republic, Sep. 27-29, 1999, 18 pages.
Aguilera et al., "Efficient Atomic Broadcast Using Deterministic Merge," Symposium on Principles of Distributed Computing, 2000, 10 pages.
Opyrchal et al., "Exploiting IP Multicast in Content-Based Publish-Subscribe Systems," Proceedings of the IFIP/ACM International Conference on Distributed Systems Platforms (Middleware 2000), Apr. 2000, 23 pages.
Caplin Systems Ltd., White Paper "Real Time Text Protocol (RTTP)," Version 1.1, Sep. 2000, 11 pages.
Reuters, "Reuters Market Data Systems and the Trading Solutions Architecture," Version 1.0, Jan. 12, 2001, 51 pages.
Ramamrithan et al., "Dissemination of Dynamic Data on the Internet," [online]. Powerpoint Presentation, Spring 2001, [retrieved on Feb. 6, 2002], 5 pages. Retrieved from the Internet <.cs.umbc.edu/courses/graduate/CMSC691T/spring.sub.--2001/rlist/amit.ppt>.
ComputerLetter, vol. 17, No. 23, Jul. 16, 2001, pp. 1-8.
ComputerLetter, vol. 17, No. 31, Sep. 24, 2001, pp. 1-6.
ComputerLetter, vol. 17, No. 35, Nov. 5, 2001, pp. 1-6.
Tuttle et al., "Upstream Delivery of Information in a Digital Network", U.S. Appl. No. 09/901,582, filed Jul. 9, 2001.
"Repackaging the Net", ComputerLetter, vol. 17, No. 35, Nov. 5, 2001, pp. 1-5.
"Reckoning with IP", ComputerLetter, vol. 17, No. 37, Nov. 19, 2001, pp. 1-6.
"Persistence Counts", ComputerLetter, vol. 17, No. 23, Jul. 16, 2001, pp. 1, 5-7.
Zhao et al.; "A Workflow-centric Study of Organizational Knowledge Distribution;" Proceedings of the 33rd Hawaii International Conference on System Sciences; 2000; pp. 1-10; IEEE.
Gribble, et al.; "The Ninja Architecture for Robust Internet-scale Systems and Services;" Computer Networks; 2001; pp. 473-497; vol. 35; Elsevier Science B.V.
Written Opinion of the International Searching Authority for International Application No. PCT/US2005/029162, recorded Jan. 17, 2006, 7 pages.
Written Opinion of the International Searching Authority for International Application No. PCT/US2005/029021, recorded Dec. 14, 2005, 10 pages.
Written Opinion of the International Searching Authority for International Application No. PCT/US2005/029158, recorded Jan. 25, 2006, 7 pages.
Final Office Action dated Oct. 7, 2009, U.S. Appl. No. 11/515,233, Rumelhart et al., filed Aug. 31, 2006.
Final Office Action dated Nov. 24, 2009, U.S. Appl. No. 11/205,237, Rumelhart et al., filed Aug. 15, 2005.
Office Action dated Oct. 29, 2010, Korean Appl. No. 10-2007-7006143, 5 pgs.
Non-Final Office Action dated Jan. 19, 2010, U.S. Appl. No. 11/396,251, Tuttle et al., filed Mar. 3, 2006.
Non-Final Office Action dated Jan. 7, 2010, U.S. Appl. No. 11/205,233, Rumelhart et al., filed Aug. 15, 2005.
Non-Final Rejection dated Dec. 23, 2010, U.S. Appl. No. 11/469,325, Rumelhart et al., filed Aug. 31, 2006.
Final Rejection dated Jun. 7, 2011, U.S. Appl. No. 11/469,325, Rumelhart, et al., filed Aug. 31, 2006, 16 pages.
Welsh, M., and Culler, D., Adaptive Overload Control for Busy Internet Servers, Proc. Of the 4th USENIX Conf. on Internet Technologies and Systems, Mar. 26-28, 2003.
Welsh, M., Gribble, S.D., Brewre, E.A., and Culler, D., A Design Framework for Highly Concurrent Systems, Technical Report, EECS Department, Univ. of California, Berkeley, 2000, UCB/CSD-00-1108, URL: http://www.eecs.berkeley.edu/Pubs/TechRpts/2000/CSD-00-1108.pdf.
Japanese Office Action dated Jul. 4, 2011, Japanese Application No. 2007-527954, filed Aug. 15, 2008, 2 pages.
Non-Final Rejection mailed Feb. 27, 2012 for U.S. Appl. No. 11/469,325, filed Aug. 31, 2006; 17 pages.
Notice of Allowance mailed Jul. 30, 2012 for U.S. Appl. No. 11/469,325, filed Aug. 31, 2006; 7 pages.
International Search Report directed to related International Patent Application No. PCT/US2005/029158, mailed Jan. 27, 2006; 3 pages.
Notice of Allowance mailed Oct. 19, 2012 for U.S. Appl. No. 11/469,325, filed Aug. 31, 2006; 10 pages.

* cited by examiner

DYNAMICALLY ALLOCATING THREADS FROM A THREAD POOL TO THREAD BOUNDARIES CONFIGURED TO PERFORM A SERVICE FOR AN EVENT

CROSS-REFERENCES TO RELATED APPLICATIONS

This application claims priority from U.S. Provisional Patent Application No. 60/602,539, filed Aug. 17, 2004, entitled "TECHNIQUES FOR DELIVERING PERSONALIZED CONTENT WITH A REAL-TIME ROUTING NETWORK, MODULAR EVENT-DRIVEN ARCHITECTURE, MODULAR EVENT-DRIVEN PROCESSING AND VIEWER FAILOVER TESTING A SYSTEM MEMORY WHILE AN OPERATING SYSTEM IS ACTIVE", which is hereby incorporated by reference, as if set forth in full in this document, for all purposes.

BACKGROUND

Embodiments of the present disclosure relate generally to high performance computing and to providing computing services in a modular, event driven manner.

A computing device may have a limited number of resources in which to process requests. In order to efficiently process the requests, the device may need to manage how the resources may be allocated to which requests. When a resource is assigned to a request, that request may be processed. Devices may see large increases in requests for certain reasons. For example, a server serving web pages for a web site to many users may receive a large number of requests for web pages from users. The users may see delays if resources are not assigned to request in an efficient manner.

The figures depict some embodiments for purposes of illustration only. One skilled in the art will readily recognize from the following discussion that alternative embodiments of the structures and methods illustrated herein may be employed.

A further understanding of the nature and the advantages of the disclosure disclosed herein may be realized by reference of the remaining portions of the specification and the attached drawings.

DETAILED DESCRIPTION

In one embodiment, modular event driven processing provides a plurality of thread boundaries, each thread boundary comprising functionality to be performed for a given event by a single thread. A plurality of queues may be communicatively coupled to the thread boundaries, such that thread boundaries may be connected by queues through which events may be routed. The division of the computational functionality into thread boundaries enables identification of those portions that may be sensitive to load, because their corresponding queues may fill. Computational resources such as threads may then be dynamically allocated to thread boundaries based on queue depth.

A plurality of tasks may be in a defined relationship to provide a service, where each task may be associated with a thread boundary and includes a unit of code for performing a specific function. A plurality of service utilities may also provided, where each service utility includes a utility that may be accessible by multiple tasks.

In some embodiments, the tasks and the defined relationship between them may be described at a high level externally to the system itself, and capable of according to that high level description. In some embodiments, this high-level description may be in a declarative language, such as Extensible Markup Language (XML). This high-level external description enables dynamic configuration of the tasks and the relationship between them, as well as for authentication thereof.

Figure 1:
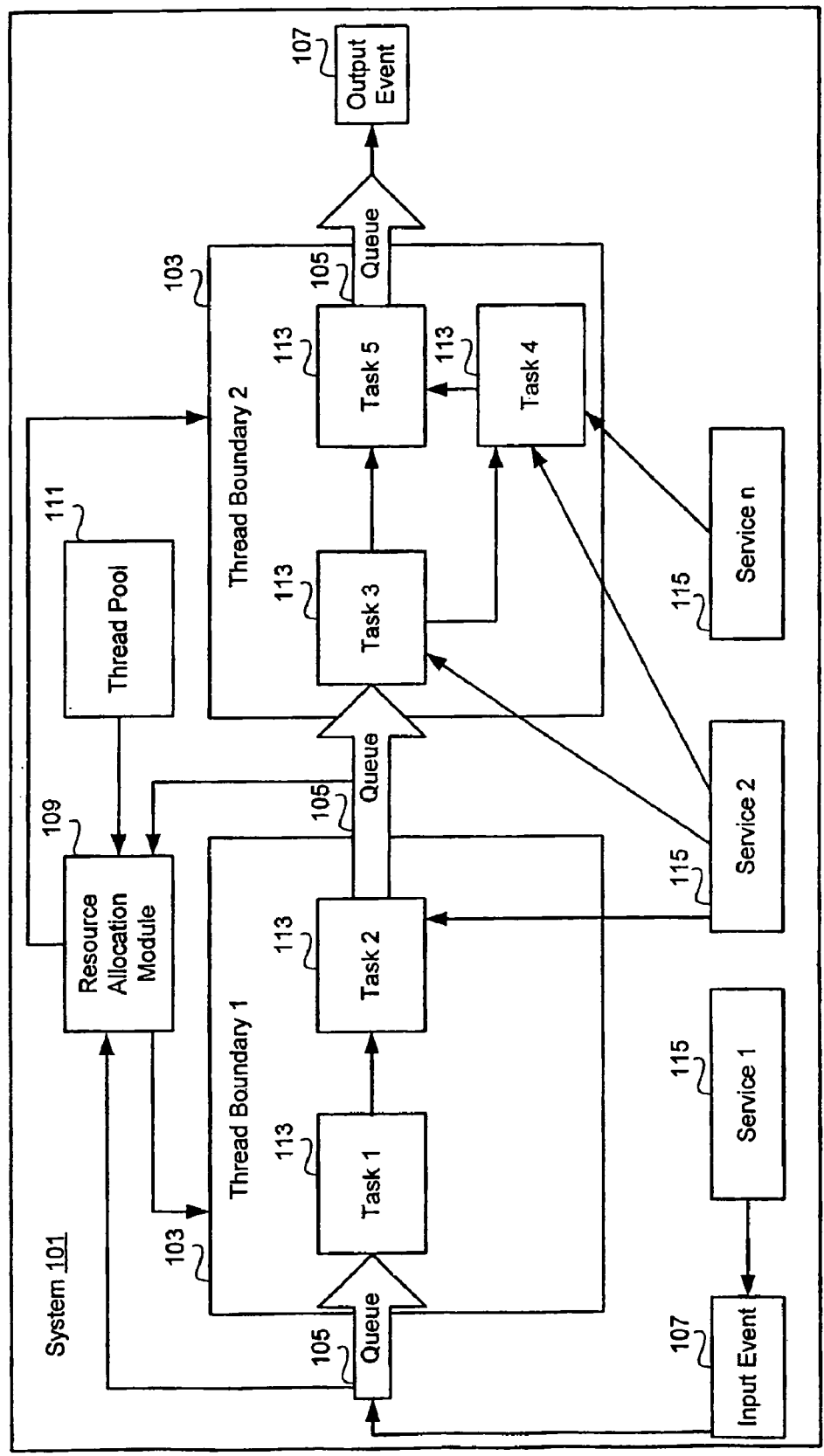
FIG. 1 is a block diagram illustrating a high-level overview of a system according to one embodiment.

FIG. 1 illustrates a high-level overview of a system 101 according to one embodiment. System 101 may be provided in any computing device that processes information. For example, system 101 may be included in a server or router.

System 101 provides some functionality (e.g., a service). The functionality may be divided into a plurality of thread boundaries 103, where each thread boundary 103 may encapsulate a portion of the application logic for the desired functionality. The thread boundaries may be connected by thread boundary queues 105. Events 107 (e.g., requests for service, messages) may be input to and output from thread boundaries 103 via thread boundary queues 105.

An event may be any processing that may be required. One example of an event 107 may be a request by a remote client for a service. For example, the client may request to log in, in which case system 101 (e.g., a server) would need to check the client's credentials and then take appropriate action. According to some embodiments, system 101 may handle this request by encapsulating it as an event 107 and passing it though a chain of thread boundaries 103, each of which may be capable of performing a small piece of the service, ultimately outputting either a verification or denial of the log in. Various other examples of events will be apparent to those of ordinary skill in the art in light of this specification, e.g., events may include processing a request for a record from a database, processing of an incoming e-mail message, handling outgoing encoded data, sending an outgoing error message, processing requests for web pages, etc.

A computing system such as a server may need to handle a large number of events simultaneously. Therefore, events 107 between thread boundaries 103 may reside in thread boundary queues 105. Within a thread boundary 103, a single thread may handle an event 107. However, once a first thread boundary 103 completes its processing for an event 107 and places the event 107 in a queue 105, another thread may pick up the event 107 and move it through the next thread boundary 103.

FIG. 1 depicts two thread boundaries 103, but any number of thread boundaries may be provided. Many computing systems provide complex functionality, which can be divided into many thread boundaries 103 as desired. The division of functionality into thread boundaries 103, as well as the number of thread boundaries 103 to use, may differ. Many variations will be apparent to those of ordinary skill in the relevant art in light of this specification.

The division of the functionality into thread boundaries 103 enables identification of those portions that may be sensitive to load, because their corresponding thread boundary queues 105 may fill. In some embodiments, a resource allocation module 109 monitors the thread boundary queues 105, and allocates computational resources to the corresponding thread boundaries 103 based on queue depth. For example, a number of events being held in a first queue 105 and a second queue 105 may be determined. Resources may be allocated based on the number of events being held in first queue 105 and second queue 105, respectively. For example, if first queue 105 is longer than second queue 105, more resources may be allocated to first thread boundary 103. Accordingly, the load of a thread boundary 103 may be used to determine how to dynamically allocate resources. Although queue length is described, it will be understood that other techniques of determining the load may be used, such as using a number of events being processed by a thread boundary 103. In the embodiment illustrated in FIG. 1, the resource allocation module 109 may be centralized, and therefore separate from the application logic encapsulated by the thread boundaries 103 and queues 105.

In some embodiments, the resource allocation module 109 assigns threads from a thread pool 111 to thread boundaries 103 according to the length of their inbound queues 105, or according to other metrics as desired. As will be understood by those of ordinary skill in the relevant art, each event 107 may be handled by a single thread (or multiple threads) within a thread boundary 103. Multiple events 107 can be processed through the same boundary 103 in parallel, and such parallel event 107 processing can be performed by multiple threads (no more than one per event 107 in one embodiment) as desired.

Thus, portions of the system 101 that might otherwise become bottlenecks may receive more resources, thereby smoothing out application flow and improving performance. Since the allocation may be dynamic, the resource allocation module 109 can respond to varying conditions. If the system 101 receives a flood of a certain type of requests, for example, a portion that may not normally a bottleneck may become overloaded. Under such circumstances, the resource allocation module 109 can react accordingly, by dynamically altering computational resource allocation.

This provides advantages because the division of processing into thread boundaries may not involve allocating a single request to one thread, which then performs all processing for the request. Each request may not be treated as being the same in terms of the resources it may require. System 101 may tune itself to load that builds at thread boundaries where events may queue. Thus, the internal performance of system 101 may be monitored and may be tuned in response to load.

Also, system 101 may use queue length of queues for thread boundaries to determine where to allocate resources. This allows system 101 to determine where to allocate resources without introducing complex functionality on how to prioritize events.

It may be understood that although the resource allocation module 109 may be illustrated as a single entity, as the term may be used herein a resource allocation module 109 refers to a collection of functionalities that may be implemented as software, hardware, firmware or any combination of the three. Where the resource allocation module 109 may be implemented as software, it can be implemented as a standalone program, but may also be implemented in other ways, for example as part of a larger program, as a plurality of separate programs, or as one or more statically or dynamically linked libraries.

As illustrated in FIG. 1, the functionality encapsulated by each thread boundary 103 may be performed by one or more tasks 113. As the term may be used herein, a task 113 may include any block of code for performing a specific function. Multiple tasks 113 can be included in a chain to provide desired computational services.

Figure 2:
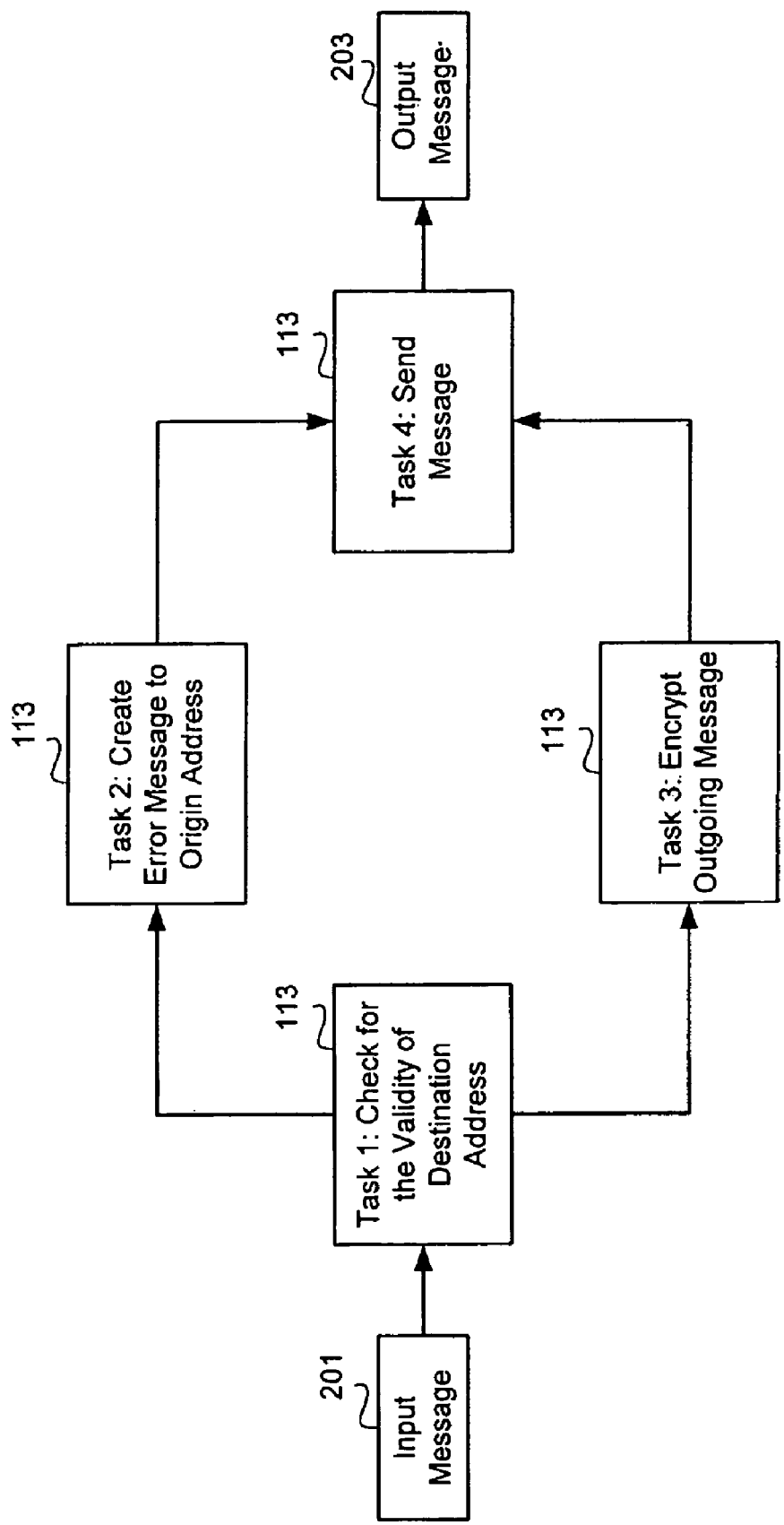
FIG. 2 is a block diagram illustrating an example of four tasks capable of encrypting and sending outgoing messages according to one embodiment.

FIG. 2 illustrates a simple example of four tasks 113 capable of encrypting and sending messages. An input message 201 to be encrypted and transmitted may be received by Task 1, which checks the validity of the destination address. If the destination address is valid, Task 3 encrypts the input message 201, and Task 4 sends the encrypted message 203 as output to the destination address. On the other hand, if the destination address is invalid, Task 2 creates an appropriate error message which Task 4 sends as an output message 203 to the origin address. The functionality provided by the four tasks may be part of a much larger computing system, as desired.

Returning to FIG. 1, tasks 113 may be at a finer level of granularity than thread boundaries 103. Multiple tasks 113 can be encapsulated within a single thread boundary 103, although it may also be possible for a thread boundary 103 to contain only a single task 113. Specific tasks 113 may be allocated to specific thread boundaries 103. For example, FIG. 1 shows tasks 1 and 2 as being encapsulated within thread boundary 1, and tasks 3-5 as being encapsulated within thread boundary 2. In other embodiments, tasks 1-5 may be divided between more than two thread boundaries 103, or all five tasks may be encapsulated within a single thread boundary as desired. There may be many possibilities for allocating tasks 113 to thread boundaries according to various embodiments. As will be apparent to those of ordinary skill in the relevant art in light of this specification, the relationship between tasks 113 and thread boundaries 103 can be set and modified by configuration changes, as desired.

As illustrated in FIG. 1, all desired functionality may not be performed by tasks 113. For example, certain functionality may be performed by service utilities 115, which may be utilities that may be used by multiple tasks 113. In addition to creating efficiency by centralizing standard utilities, service utilities 115 add another layer of flexibility. In embodiments in which tasks 113 access service utilities 15 through an interface, it may be possible to swap implementations of a service 15 without altering any of the tasks 113 that rely on it. For example, if many tasks 113 are required to write to a log file, a logging service may be provided. Tasks 113 may access the logging service through service utilities 115. Services 115 may store state and thus may be used be multiple tasks 113 for an event.

Service utilities 115 can be used as the originating sources for events 107. For example, when a client issues a request, a network protocol service 115 may be responsible for packaging the request as an event 107, and inserting it into the appropriate thread boundary queue 105, so as to enter the request into the task flow. Whereas events 107 may be created by service utilities 15 and passed to tasks 113 for processing, tasks typically modify existing events 107, and forward them to other tasks 113.

In some embodiments, service utilities 115 can store state, whereas tasks 113 may be stateless. A list of currently registered users, for example, would typically be controlled by a service 15. A task 113 may access the list by calling a method on the service 115. Although tasks 113 are described as being stateless, tasks 113 may store state in some embodiments.

In one embodiment, tasks 113 may not create threads or have any knowledge about what threads may be controlling internal task 113 procedures. Service utilities 115, on the other hand, may be thread-safe, since they may be accessed by multiple tasks 113 running in different thread boundaries 103. Thus, service utilities 115 may be accessed by multiple threads.

When to utilize a task 113 and when to use a service 115 may vary. In some embodiments, tasks may be used as much as possible. In such embodiments, a service 115 may be used for a utility that cuts across many tasks 113, a component that originates events 107, or a component that manages state. In other embodiments tasks 113 and/or service utilities 115 may be used for more or fewer purposes as desired. It will be apparent to those of ordinary skill in the relevant art in light of this specification that the terms "task" and "service" may be merely used herein to describe various functionalities. This particular naming for these functionalities may not be mandatory or significant, and the mechanisms that implement various embodiments and/or its features may have different names, divisions and/or formats.

As explained above, a plurality of tasks 113 may be in a defined relationship so as to provide desired functionality for a service. The defined relationship between tasks 113 may depend upon the functionality to be provided. For example, tasks 113 may be arranged differently depending on the functionality desired. As explained above, tasks 113 may receive events 107 as input, perform operations thereon, and pass the (possibly transformed) events 107 on to other tasks 113 for further processing. A task 113 can make decisions as to how to process an event 107 and/or where to pass it, based on its contents or other factors.

Specific tasks 113 may be capable of receiving specific input, executing specific processing, and sending specific output. A task 113 may be processing code, with zero or more inputs (in other words, sources from which the task receives data in the form of events 107) and zero of more outputs, through which the task 113 sends events 107 after processing. The input, processing and output associated with a task 113 can be thought of as defining contracts for the task 113. A source contract specifies constraints on events 107 received via the task's 113 input. A sink contract describes the changes the task 113 makes to events 107 that pass through it. The terms "input," "output," "source contract," and "sink contract" are linguistic terms, used herein to describe the underlying functionality. Other names to be used to describe such aspects and functionality may be contemplated.

To illustrate an example of a source contract and a sink contract, a client may request authentication of a user, by transmitting an event 107 (i.e. an authentication request) to the system 101 (e.g., a server). For sake of example, suppose the event 107 contains a string called "username," a string called "password." This event 107 may be passed to a validator task 113 whose source contract specifies that it receives a string called "password" and a string called "username." The task 113 may use these strings to authenticate the user. The authentication result may be passed on to various tasks 113 downstream and the validator task's 113 sink contract may specify that a Boolean called "valid" be added to the event 107. In other cases, a task's 113 sink contract might remove items from an event 107.

In some embodiments, the tasks 113 and the defined relationship between them may be described at a high level externally to the system itself, and configured according to the high level description. In some embodiments, this high-level description is in a declarative language, such as Extensible Markup Language (XML). The high-level description can be stored, for example in an XML configuration file.

This high-level external description enables dynamic configuration of the tasks 113 and the relationship between them, as well as for authentication thereof. As will be readily apparent to those of ordinary skill in the relevant art in light of this specification, the high level description of the tasks 113 and the defined relationship between them may include a description of the task's 113 functionality, inputs and outputs, source contracts and sink contracts, as well as the way in which the plurality of tasks 113 may be related together to provide the desired functionality, and the assignment of tasks 113 to thread boundaries 103. In some embodiments, more or less information may be included in the high-level description.

Figure 3:
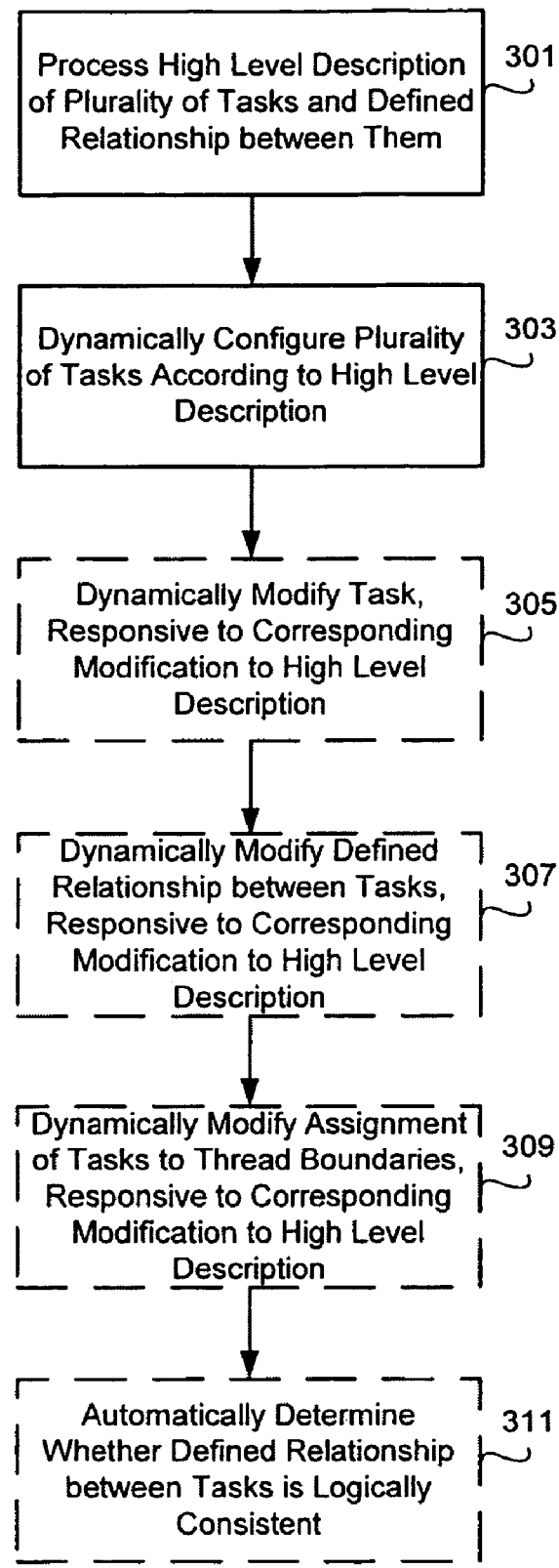
FIG. 3 is a flowchart illustrating steps for processing a high level description of tasks and the relationship between them according to one embodiment.

FIG. 3 illustrates steps for processing a high-level description of the tasks 113 and the relationship between them according to one embodiment. In step 301, the system 101 reads the high level description (e.g. from an XML configuration file). In step 303, system 101 dynamically configures the plurality of tasks accordingly.

Dynamic modifications to tasks 113 and/or the relationship between tasks 113 may be made by making corresponding modifications to the high level description. In step 305, the system 101 may dynamically modify a task 113, responsive to a corresponding modification of the high level description. Additionally, in steps 307 and 309, the system 101 may dynamically modify the defined relationship between the plurality of tasks 113, or the assignment of tasks 113 to thread boundaries 103, responsive to a corresponding modification of the high level description.

In step 311, the high level description may also be used to automatically determine whether the defined relationship between the tasks 113 may be logically consistent. Such determination, may, for example, include verification of source and sink contracts.

Figure 4:
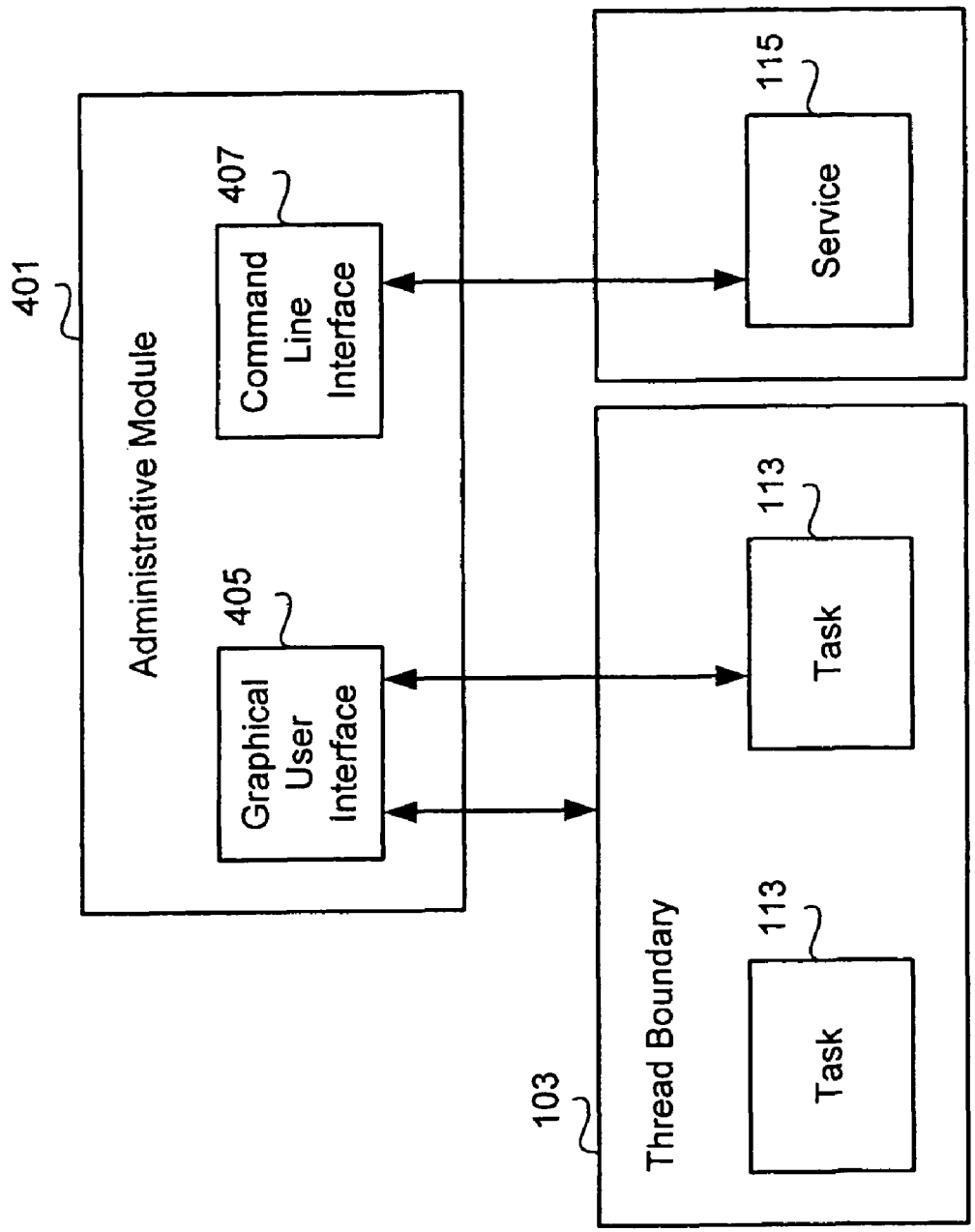
FIG. 4 is a block diagram illustrating a high-level overview of an administrative module according to one embodiment.

FIG. 4 illustrates a high level overview of an administrative module 401 according to one embodiment. As illustrated in FIG. 4, in some embodiments, tasks 113, service utilities 115 and or thread boundaries 103 may be implemented such that these components may be monitored and controlled via the administrative module 401. In such embodiments, tasks 113 and/or other components may be communicatively coupled to the administrative module 401, and attributes (e.g., the number of active connections) of these tasks 113 or other components can be monitored or dynamically modified from the administrative module 401, for example via a graphical user interface 405 or command line 407, or where appropriate a configuration file.

In one such embodiment, the above-described communication between the components and the administrative module 401 may be performed via the Java Management Extension's (JMX) MBean interfaces. In such embodiments, tasks 113, service utilities 115 and/or thread boundaries 103 may be implementations of an MBean, and thus automatically include an MBean interface exposed to the administrative module 401, which in such embodiments may be built on top of JMX.

JMX separates administration, management, and monitoring of components from the components themselves. This allows the administration front-end of an application to be swappable. As an example, a computing system such as a server could include an administrative module 401 packaged with both a web based graphical user interface 405 and a command line interface 407 for monitoring and controlling components. These interfaces 405, 407 can be developed independently using the rules and interfaces defined by JMX, in a manner that will be apparent to those of ordinary skill in the art in light of this specification. These interfaces 405, 407 can subsequently be used to monitor and dynamically configure tasks 113, service utilities 115 and/or thread boundaries 103, in a manner that will also be apparent to those of ordinary skill in the art in light of this specification. Of course, other embodiments may be implemented in development environments other than JMX, as desired.

As will be understood by one skilled in the art, the disclosure may be embodied in other specific forms without departing from the spirit or essential characteristics thereof. Likewise, the particular naming and division of the modules, features, attributes, methodologies and other aspects may not be mandatory or significant, and the mechanisms that implement embodiments or its features may have different names, divisions and/or formats. Furthermore, as will be apparent to one of ordinary skill in the art, the modules, features, attributes, methodologies and other aspects of the disclosure can be implemented as software, hardware, firmware or any combination of the three. Wherever a component may be implemented as software, the component may be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, embodiments may be in no way limited to implementation in any specific programming language, or for any specific operating system or environment. Accordingly, the disclosure is intended to be illustrative, but not limiting, of the scope of the disclosure, which is set forth in the following claims.

In one embodiment, the term "and/or" may indicate that any combination of elements connected by "and/or" may be used. For example, two words or expressions in a phrase using "and/or" may mean one or the other or both. In one embodiment, the term "substantially" may mean being largely but not wholly that which may be specified, or all that may be specified. In one embodiment, the term capable of may mean configured, adapted, able, etc. For example, the term capable of performing an action may mean an element may be able to perform the action, may be configured to perform the action and/or may be adapted to perform the action.

Embodiments can be implemented in the form of control logic in software or hardware or a combination of both. The control logic may be stored in an information storage medium as a plurality of instructions adapted to direct an information processing device to perform a set of steps disclosed in one embodiment. Based on the disclosure and teachings provided herein, a person of ordinary skill in the art will appreciate other ways and/or methods to implement the embodiments.

The above description is illustrative but not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

What is claimed is:

1. A method, comprising:
   determining, using a processing device, a load at a first thread boundary based on a comparison of a number of events being held at a first thread boundary queue coupled to the first thread boundary and a number of events being held in a second thread boundary queue coupled between the first thread boundary and a second thread boundary,
   wherein the first and second thread boundaries are configured to perform a service for an event, the first thread boundary includes at least one thread and at least one task associated with at least a part of the service, and the at least one task is dynamically configured according to a high level language description; and
   dynamically allocating, using the processing device, one or more additional threads from a thread pool, separate from the first and second thread boundaries, to the first thread boundary based on the determined load, wherein the one or more additional threads perform the at least a part of the service associated with the at least one task.

2. The method of claim 1, wherein determining the load further comprises determining the number of events to be processed by the first thread boundary.

3. The method of claim 2, wherein the first thread boundary queue is configured to hold the number of events.

4. The method of claim 3, wherein determining the load further comprises determining the number of events being held in the thread boundary queue.

5. The method of claim 2, wherein the first thread boundary is configured to perform the at least a part of the service on the number of events.

6. The method of claim 2, further comprising:
   determining a second load for a second thread boundary; and
   dynamically allocating a second set of one or more additional threads to the second thread boundary based on the determined second load, wherein the second set of one or more additional threads performs at least another part of the service.

7. The method of claim 6, wherein determining the second load comprises determining a second number of events to be processed by the second thread boundary.

8. The method of claim 1, wherein the at least one task has a defined relationship with at least one other task in order to perform the service for the event.

9. The method of claim 1, wherein the event is processed by the first and second thread boundaries in order to perform the service for the event.

10. The method of claim 1, wherein the event and a second event are processed in parallel in the first thread boundary.

11. The method of claim 1, wherein the high level language description is configured to automatically determine whether a configuration of the at least one task is logically consistent.

12. A computer system for processing events, the computer system comprising:
   a plurality of thread boundaries, wherein the plurality of thread boundaries are configured to perform a service, wherein a first thread boundary in the plurality of thread boundaries includes at least one thread and at least one task configured to perform at least a part of the service;
   a plurality of thread boundary queues coupled to the thread boundaries, wherein a first thread boundary queue is configured to hold one or more for routing to the first thread boundary, and wherein the first thread boundary is connected to a second thread boundary via a second thread boundary queue, and wherein the at least one task is dynamically configured according to a high level language description; and
   a resource allocation module configured to allocate one or more additional threads to the first thread boundary from a thread pool, separate from the plurality of thread boundaries, based on a comparison of a number of events being held in the second thread boundary queue.

13. The system of claim 12, wherein the allocated one or more additional threads perform the at least the part of the service for the number of events being held in the first thread boundary queue.

14. The system of claim 12, wherein the resource allocation module is configured to allocate a first set of additional threads to the first thread boundary and a second set of additional threads to a second thread boundary in the plurality of thread boundaries further based on a first boundary queue depth, wherein the first thread boundary queue depth is based on a number of events being held in the first thread boundary queue, and a second thread boundary queue depth, wherein the second thread boundary queue depth is based on the second number of events being held in the second thread boundary queue.

15. The system of claim 12, further comprising:
a thread pool comprising the one or more threads to be allocated to thread boundaries based on thread boundary queue depth, the thread pool being coupled to the resource allocation module.

16. The system of claim 12, wherein at least one of the plurality of tasks is stateless.

17. The system of claim 12, further comprising a service utility configured to provide a utility, wherein the at least one task in the first thread boundary is configured to use the service utility to perform its part of the service.

18. The system of claim 17, wherein the service utility is configured to store a state.

19. The system of claim 12, wherein the at least one task of the first thread boundary has defined relationship with at least one other task in order to perform the service.

20. The system of claim 12, wherein an event in the number of events is processed by the plurality of thread boundaries in order to perform the service for the event.

21. The system of claim 20, wherein the event is passed from the first thread boundary to a second thread boundary queue, and wherein the second thread boundary processes the event.

22. The system of claim 12, wherein a first event and a second event in the one or more events are processed in parallel in the first thread boundary.

23. A computer system for processing events, the computer system comprising:
a first thread boundary comprising a first task, wherein the first task comprises processing functionality to perform a first function;
a second thread boundary comprising a second thread and a second task, wherein the second task comprises processing functionality to perform a second function;
a first thread boundary queue coupled to the first thread boundary;
a second thread boundary queue coupled to the second thread boundary, wherein the second thread boundary queue connects the first thread boundary and the second thread boundary and enqueues one or more events routed from the first thread boundary to the second thread boundary; and
a resource allocation module configured to allocate one or more additional threads from a thread pool, separate from the first and second thread boundaries, to the first and second thread boundaries, wherein one or more additional threads perform the first and second processing functions, wherein at least one of the first and second task is dynamically configured according to a high level language description, and wherein the one or more additional threads are allocated to the first thread boundary based on a comparison of a number of events being held in the first thread boundary queue with a number of events being held in the second thread boundary queue.

24. The system of claim 23 further comprising:
the thread pool comprising the one or more additional threads to be allocated to the first and second thread boundaries based on the first and second thread boundary queue depth.

25. The system of claim 23, wherein first and second tasks are stateless.

26. The system of claim 23, further comprising:
a service utility, wherein the service utility comprises a utility that is configured to be accessed by the first task or second task in performing the first processing function or the second processing function.

27. The system of claim 26, wherein the service utility is configured to store a state.

28. The system of claim 23, wherein the first task and the second task have a defined relationship in order to perform an overall functionality based on the first processing function and second processing function.

29. The system of claim 23, wherein the one or more events are processed by the first and second thread boundaries in order to perform an overall function defined by the first processing function and second processing function.

30. The system of claim 23, wherein a first event and a second event in the one or more events are processed in parallel.

31. A method for processing events, the method comprising:
receiving, using a processing device, a request for a service to be performed, wherein the request includes a first event;
dividing, using the processing device, logic of an application programmed to perform the service into a plurality of thread boundaries, each including at least one thread, according to a high level language description and dynamically configuring relationships between a plurality of tasks associated with the plurality of thread boundaries, wherein the plurality of thread boundaries are connected by a plurality of queues, wherein the first event is input into a first thread boundary in the plurality of thread boundaries via a first queue in the plurality of queues, and wherein the first thread boundary outputs a second event to a second queue in the plurality of queues, wherein the second queue is coupled between the first thread boundary and a second thread boundary;
determining, using the processing device, a load at the first thread boundary based on a comparison of a number of events held in the first queue with a number of events held in the second queue; and
dynamically allocating, using the processing device, one or more additional threads from a thread pool, separate from the plurality of thread boundaries, to the first thread boundary based on the determined load.

* * * * *

UNITED STATES PATENT AND TRADEMARK OFFICE
CERTIFICATE OF CORRECTION

PATENT NO.         : 8,397,237 B2
APPLICATION NO.    : 11/205263
DATED              : March 12, 2013
INVENTOR(S)        : Rumelhart et al.

It is certified that error appears in the above-identified patent and that said Letters Patent is hereby corrected as shown below:

On the Title Page

Item (56), under "OTHER PUBLICATIONS", in Column 2, Line 2,
delete "Well-Condidtioned" and insert -- Well-Conditioned --, therefor.

On Page 2, Item (56), under "OTHER PUBLICATIONS", in Column 2, Lines 3-4, delete
"p. I-p. 17." and insert -- p. 1-p. 17. --, therefor.

On Page 3, Item (56), under "OTHER PUBLICATIONS", in Column 1, Line 11, delete
"Retrived" and insert -- Retrieved --, therefor.

In the Specification

In Column 4, Line 38, delete "service utilities 15" and insert -- service utilities 115 --, therefor.

In Column 4, Line 40, delete "service 15" and insert -- service 115 --, therefor.

In Column 4, Line 44, delete "be used be" and insert -- be used by --, therefor.

In Column 4, Line 52, delete "service utilities 15" and insert -- service utilities 115 --, therefor.

In Column 4, Line 58, delete "service 15." and insert -- service 115. --, therefor.

In Column 5, Line 48, delete ""usemame."" and insert -- "username." --, therefor.

In Column 6, Line 32, delete "and or" and insert -- and/or --, therefor.

In Column 6, Line 40, delete "command line 407," and insert -- command line interface 407, --,
therefor.

Signed and Sealed this
Eleventh Day of March, 2014

Michelle K. Lee
*Deputy Director of the United States Patent and Trademark Office*

CERTIFICATE OF CORRECTION (continued)
U.S. Pat. No. 8,397,237 B2

In the Claims

In Column 8, Line 17, in Claim 6, delete "a second thread" and insert -- the second thread --, therefor.

In Column 8, Line 47, in Claim 12, delete "more for" and insert -- more events for --, therefor.

In Column 8, Line 57, in Claim 12, delete "in the second thread boundary queue." and insert -- in the first thread boundary queue with a number of events being held in the second thread boundary queue. --, therefor.

In Column 8, Line 59, in Claim 13, delete "the part" and insert -- a part --, therefor.

In Column 8, Line 66, in Claim 14, delete "first boundary" and insert -- first thread boundary --, therefor.

In Column 9, Lines 3-4, in Claim 14, delete "the second number" and insert -- a second number --, therefor.

In Column 9, Line 7, in Claim 15, delete "a thread pool comprising the one or more threads" and insert -- the thread pool comprising one or more additional threads --, therefor.

In Column 9, Line 20, in Claim 19, delete "has defined" and insert -- has a defined --, therefor.

In Column 9, Line 34, in Claim 23, delete "a first task," and insert -- a first thread and a first task, --, therefor.

In Column 9, Line 51, in Claim 23, delete "wherein one" and insert -- wherein the one --, therefor.

In Column 10, Line 4, in Claim 24, delete "23" and insert -- 23, --, therefor.